CARD PROCESSING APPARATUS

Filed Feb. 18, 1958 4 Sheets-Sheet 1

INVENTORS:
Eric Azari
Alfred E. Gray
Herman J. Malin
Alfred M. Nelson
Harold B. Thompson By Smyth & Roston
Attorneys May 2, 1961 E. AZARI ET AL 2,982,544

CARD PROCESSING APPARATUS

Filed Feb. 18, 1958 4 Sheets-Sheet 2

INVENTORS:
Eric Azari
Alfred E. Gray
Herman I. Malin
Alfred M. Nelson
Harold B. Thompson By Smyth & Roston
Attorneys INVENTORS.
Eric Azari
Alfred E. Gray
Herman J. Malin
Alfred M. Nelson
Harold B. Thompson By Smyth & Roston Attorneys May 2, 1961 E. AZARI ET AL 2,982,544

CARD PROCESSING APPARATUS

Filed Feb. 18, 1958 4 Sheets-Sheet 4

INVENTORS:
Eric Azari
Alfred E. Gray
Herman J. Malin
Alfred M. Nelson
Harold B. Thompson By Smyth & Roston
Attorneys United States Patent Office 2,982,544
Patented May 2, 1961

2,982,544

CARD PROCESSING APPARATUS

Eric Azari, Pacific Palisades, Alfred E. Gray, Culver City, Herman J. Malin, Los Angeles, Alfred M. Nelson, Torrance, and Harold B. Thompson, Playa del Rey, Calif., assignors to The Magnavox Company, Los Angeles, Calif., a corporation of Delaware Filed Feb. 18, 1958, Ser. No. 715,926

11 Claims. (Cl. 271—5)

The present invention relates to card processing apparatus of the type in which information storage cards may be handled in any desired manner, and in which data on the cards may be read or new data may be written on the cards. The invention is more particularly concerned with an improved station for holding the information cards in a stacked condition adjacent a card transport medium and which includes an improved mechanism for transferring the cards from the transport medium into a card holder included in the card holding station.

Data and information may be recorded on the information storage cards in several different ways and by utilizing several different writing techniques. This data is usually recorded in accordance with a binary code, although other codes can be used if so desired to represent recorded numbers, words or combinations of the two.

For example, information may be stored on each card in the form of magnetic areas of a first or a second polarity. The magnetic areas of one polarity would then represent binary one, and the magnetic areas of the second polarity would represent binary zero. A similar recording could be achieved by patterns of holes in the cards, with the presence of a hole at any particular position representing, for example, binary one and the absence of a hole at that position representing binary zero.

The present invention will be described in conjunction with the magnetic type of recording. However, it will be apparent as the description proceeds that the improved card holding station of the invention is suitable for use in conjunction with any type of information storage card, and particularly in any apparatus in which it is desired to transfer cards in succession from a transport medium into a card holder to be held in a stacked condition in the card holder.

Most data processing systems using information cards provide for the transport of such cards to and from one or more card holding stations, the cards being retained or stored in the card holding stations in a generally stacked condition. A suitable transport medium is provided in such systems for transporting the cards and it is usual for the cards to be transported by the transport medium in succession past one or more transducer stations. New information is written onto selected ones of the cards at the transducer stations, or data already on the cards is read at these transducer stations for use by external means or to effectuate certain controls for handling the cards.

For flexibility in the card processing apparatus and systems of the type described above, it is preferable that each of the card holding stations included in the apparatus be reversible. That is, it is preferable that each of these stations be capable of a first operating mode in which cards may be fed in succession out of the station to the transport medium, and that the station be capable of operation in a second operating mode in which cards transported by the transport medium to the station may be transferred from that medium in succession into the station.

With reversible card holder stations of the general type described above, and by the use of suitable control circuitry, the cards can be circulated quickly through the apparatus and system from station to station. A reversible card holding station of the type under discussion is described and claimed, for example, in copending application Serial No. 645,639, this application having been filed March 12, 1957, in the name of Alfred M. Nelson et al.

Card holding stations of the reversible and non-reversible type which are capable of receiving cards from the transport medium are usually equipped with what is commonly referred to as a "stack head." This stack head is movable to an operative position in the reversible type of station and it is permanently positioned in an operative position in the non-reversible station. In most stations of this general type, the stack head includes stacking fingers and is positioned so that these fingers extend into intimate engagement with the transport medium. Then, each card carried to the station by the transport medium is caused to move up over the fingers of the stack head to be arrested by the body of the stack head at the mouth of the station.

It is also usual to provide a stationary pick-off adjacent the mouth of the station in spaced relationship with the stack head. The pick-off also has fingers which, like the fingers of the stack head, extend into intimate contact with the transport medium. The fingers of the pick-off, however, are bulged outwardly from the transport medium, and cards ride up over the bulged fingers before being arrested by the stack head.

Then, when the stack head is in its operative position, each card transported by the transport medium to the mouth of the card holding station is brought over the pick-off and into engagement with the stack head. The card is then arrested by the stack head and is held stationary across the mouth of the station with its trailing end extending over the pick-off and held out from the transport medium by the pick-off. This permits the next card to pass over the pick-off and under the preceding card. Then, as the next card is arrested by the body of the stack head, the preceding card is stripped by it from the transport medium and deposited in the card holder of the card holding station.

Card holding stations constructed in the manner described in the preceding paragraphs have proved to be generally satisfactory. These stations, when in a stacking mode and operating in the manner described above, are capable of rapidly causing cards transported on the drum to be deposited one after another in the proper order into the card holding station.

One problem sometimes encountered in the prior art type of card holding station described above, however, has been that of wear and damage suffered by the cards as they become arrested by the stack head for transfer into the station. The problem has become somewhat aggravated when it has been attempted to speed up the operation of the apparatus and system in which the stations have been used.

The chief contributing factor to this excessive wear of the cards in the prior art apparatus has been the stack head itself. In most apparatus of the general type under discussion, the cards have been carried at a relatively high speed by the transport medium. In the prior art arrangements, the cards have been driven against the surface of the body portion of the stack head by the transport medium to enable the cards to be arrested at the mouth of the card holding station. In time, however, the leading edges of the cards undergoing such treatment have sometimes become worn and damaged due to the repeated blows struck by those edges as the cards have impacted against the body of the stack head.

A primary object of the present invention is to solve the problem discussed above and to provide an improved construction for the card holding station so that cards can be arrested on the transport medium by the stack head without any apparent wear or damage to the cards during such operation, even after long intervals of use.

In the embodiments of the invention to be described, a stack head is provided with a surface essentially tangential to the transport medium, such that the cards ride over the surface when the stack head is in an operative position. A vacuum pressure is provided on the tangential surface so as to brake and stop each card without the need for the card to strike the body of the stack head with any material force in order to be arrested.

In the drawings:

Figure 1 is a top plan view of a simplified card processing apparatus incorporating reversible feeding-stacking card holding stations constructed in accordance with the invention, this view illustrating a pair of such reversible card holding stations disposed contiguous a rotatable vacuum pressure transport drum; one of the stations being shown in a stacking mode for depositing cards from the drum into its card holder, and the other station being shown in a feeding mode for feeding cards from its card holder to the transport drum;

Figure 2 is a sectional view substantially on the line 2—2 of Figure 1 showing the constructional details of the rotatable drum of Figure 1, and illustrating the manner in which the drum may be controlled to establish a vacuum pressure at its peripheral surface in order that the information storage cards may be firmly held on that surface for transportation from one station to another in the card processing apparatus;

Figures 2, 6, 7:
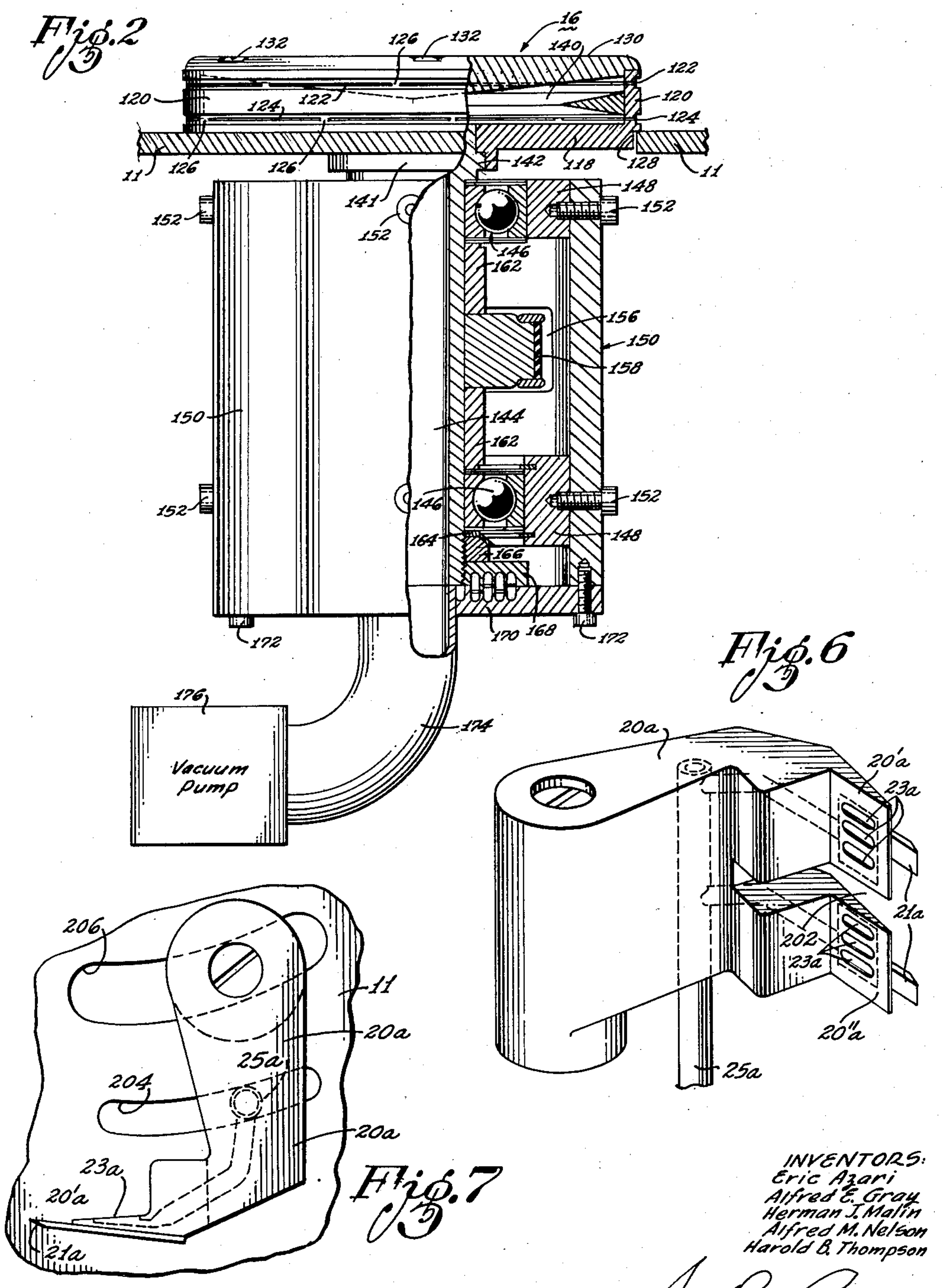
Figure 5:
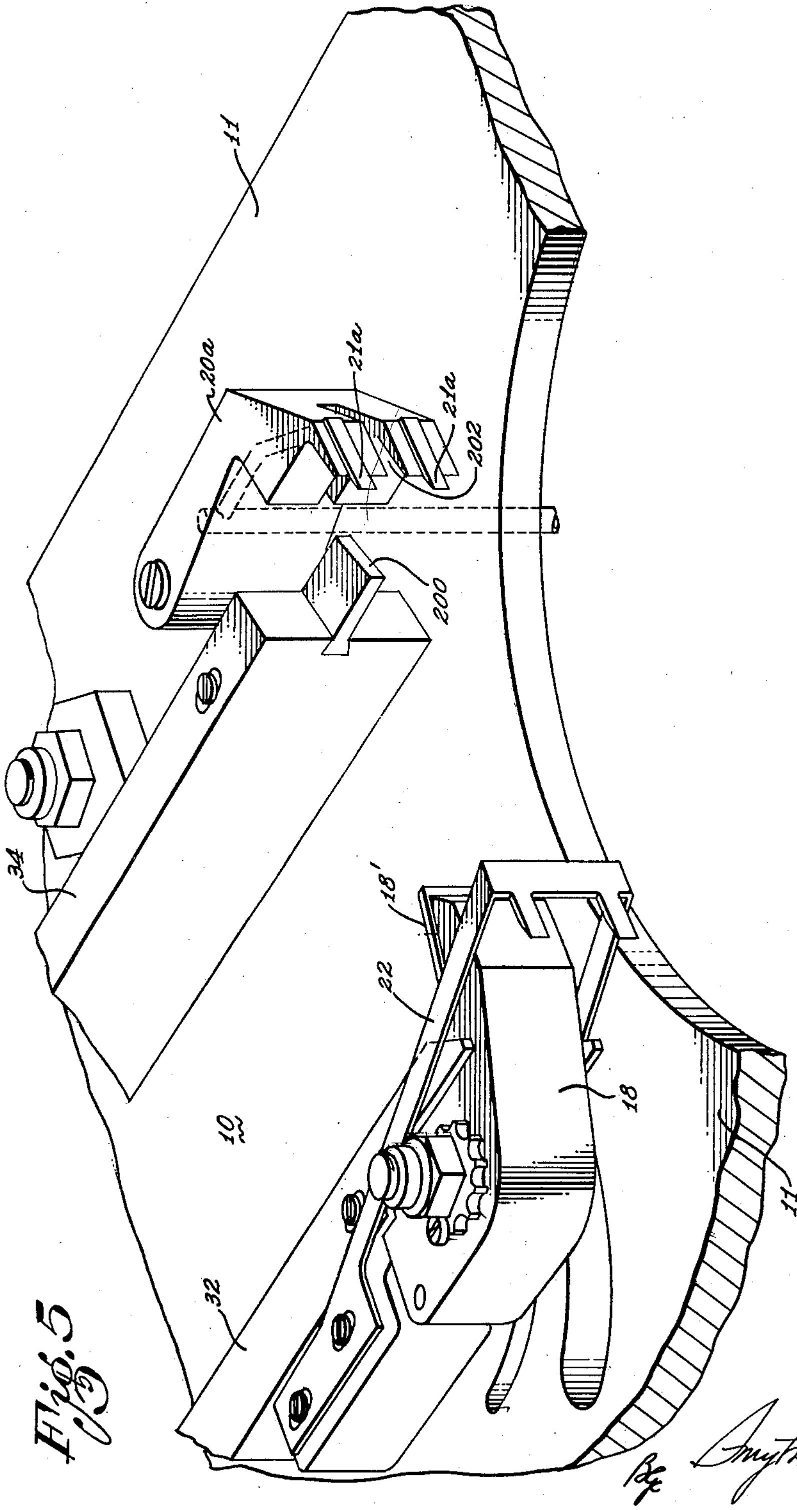
Figure 5 is an enlarged perspective view, as compared with Figure 1, of one of the reversible card holding stations of Figure 1, this view illustrating more clearly the details of the transfer mechanism incorporated in the card holding station, this transfer mechanism incorporating a stack head constructed in accordance with a second embodiment of the invention.

Figure 6 is an enlarged perspective view of the stack head of Figure 5, this latter view showing in more detail the formation of a groove in the stack head which enables it to receive a feed tongue included in the card holding station and to extend across the entire width of the feed throat of the station when the stack head is in its operative position; and Figure 7 is a top plan view of the stack head of Figure 6 and showing particularly how the pipe line for the vacuum pressure to the stack head may extend through an arcuate slot in the supporting table top.

Figure 1:
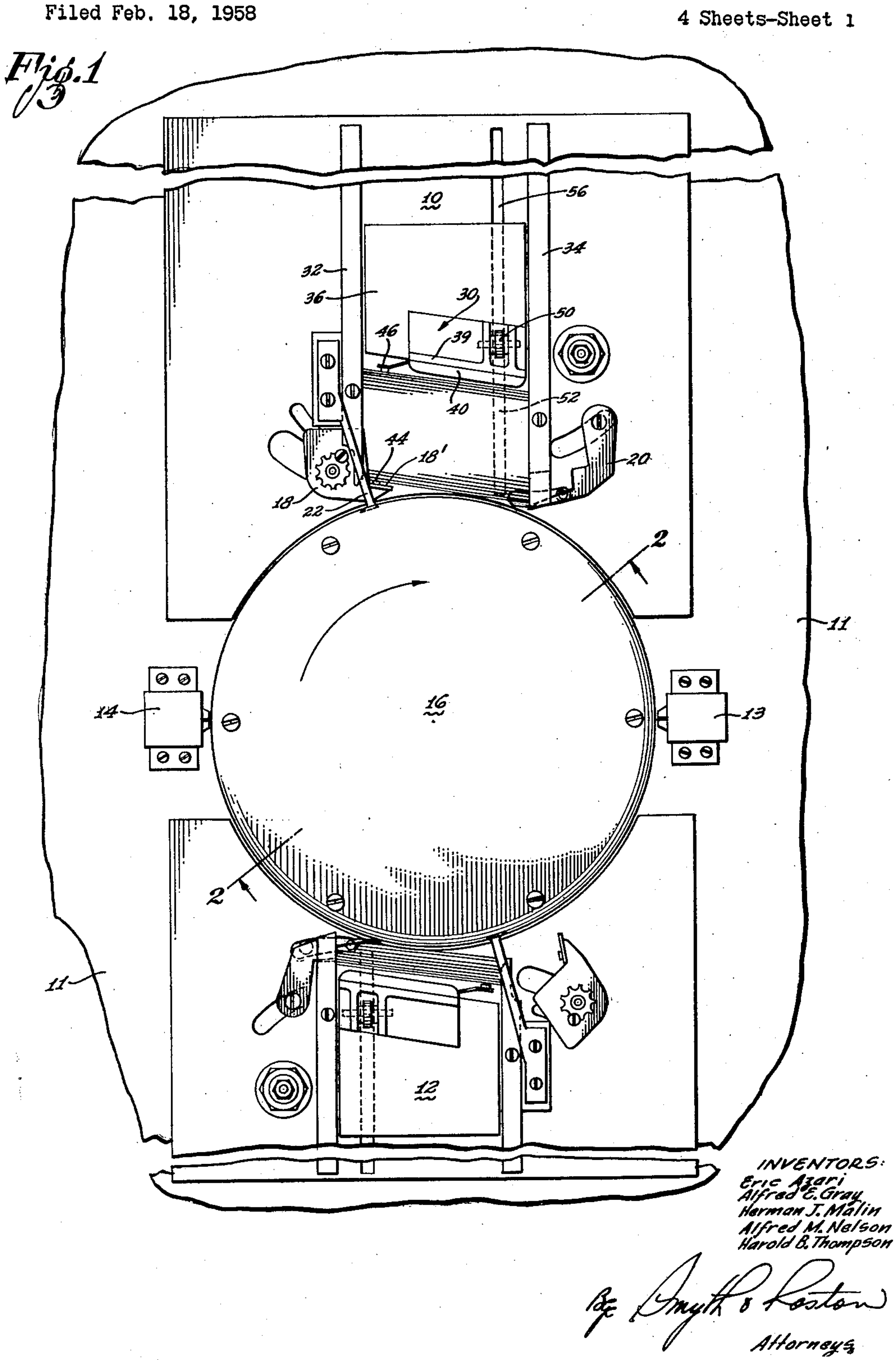

In the apparatus of Figure 1, suitable transport means is provided. The transport means for the cards are preferably movable. One type of transport means may be movable in a closed loop and may have the form of a rotatable vacuum pressure drum 16. The drum 16 is mounted on a horizontal table top 11 for rotation in a clockwise direction about a vertical axis. The drum is constructed in a manner to be described so that it may exert a vacuum pressure at its peripheral surface. This vacuum pressure enables the drum to firmly retain transported information storage cards at fixed angular positions about its periphery so that these cards may be carried by the drum from one station to another.

The rotatable transport drum illustrated in Figure 1, and which will be described subsequently, represents merely one means by which the cards can be transported from one station to another. It will be appreciated that other means may also be used.

A first card holding station 10 is mounted on the table top 11 with its mouth adjacent the peripheral edge of the transport drum 16. A second card holding station 12 is also mounted on the table top 11 diametrically opposite to the card holding station 10. The card holding station 12 also has its mouth disposed adjacent the transport drum 16.

A first transducer means 13 is mounted on the table top 11, and this transducer means is positioned between the card holding stations 10 and 12. A second transducer means 14 is also mounted on the table top 11, and the second transducer means is shown as being on the opposite side of the drum from the transducer means 13.

The transducer means 13 and 14 may be any suitable and well-known type of electromagnetic transducer head or plurality of heads. For example, these transducer means may be constructed in a manner similar to that described in copending application Serial No. 550,296, filed December 1, 1956, by Alfred M. Nelson et al. The transducer means, of course, may be any other suitable type of electromagnetic transducer. Moreover, when other types of recording are used on the information cards, these transducer means may, for example, be of the mechanical or photoelectric type.

The card holding station 10 has a vacuum pressure feed head 18 movably mounted adjacent its leading wall 32 with respect to the rotation of the drum 16. The card holding station also includes a stack head 20 which is movably mounted adjacent its trailing wall 34. The construction and operation of the feed head 18 and of the stack head 20 may be similar to that described in copending application Serial No. 645,639 referred to above.

It is believed unnecessary to include a detailed description of the constructional details of the feed head 18 and the manner in which the feed head and the stack head are moved between their operative and stand by positions in the present application. It should be pointed out, however, that the feed head 18 is controlled to exert a vacuum pressure at its surface 18' when the card holding station 10 is in its feeding mode and the feed head is moved forward to its operative position in which it extends partially across the mouth of the card holding station. This vacuum pressure is exerted on the trailing portion of the front face of the leading card in the card holding station. The leading portion of the front face of this card rests on the peripheral edge of the drum 16, and the drum also exerts a vacuum force on the card. The stack head 20 at this time is withdrawn to its standby position.

The vacuum force exerted by the drum 16 tends to withdraw the leading card from the card holding station 10, whereas the vacuum force exerted on the card by the surface 18' of the feed head tends to retain the card in the card holding station. The vacuum force exerted by the feed head 18 is made the greater of the two, so that this vacuum force is able to overcome the vacuum force exerted on the card by the drum 16. So long as the leading card is held in this manner in the card holding station 10, the other cards supported in stacked relationship in the station behind the leading card are also held in place in the station. The cards are so held in a generally stacked relationship in the station with their lower edges resting on the surface of the table top.

Whenever the vacuum pressure to the surface 18' of the feed head is momentarily interrupted, the leading card in the card holding station 10 is withdrawn by the drum 16. The trailing wall 34 of the card holding station forms in a manner to be described a throat with the periphery of the drum 16. The width of this throat is such that one card at a time only can be passed from the card holding station to the transport drum 16 upon the interruption of the vacuum pressure at the feed head 18. The interval of the interruption in the vacuum pressure to the feed head 18 may be conveniently such that only one card is released from the card holding station to the drum 16. The next card in the station now comes to the leading position, and this subsequent card may then be retained in the station by the feed head 18 until the next interruption of its vacuum pressure. Alternately, and as noted above, the feed head vacuum pressure may be interrupted for a longer period of time at which time the cards from the station are fed in a one-by-one sequence to the transport drum.

In the stacking operational mode of the card holding station 10, the feed head 18 is withdrawn to a standby position and its vacuum pressure is turned off in the manner explained in copending application Serial No. 645,639 referred to above. Simultaneously the stack head 20 is moved into its operative position at which it fills the throat between the wall 34 and the periphery of the drum 16. As will be described, the stack head has a pair of fingers 21 which enter annular peripheral grooves in the transport drum 16, and any cards transported to the mouth of the station 10 are engaged by the fingers and such cards are arrested by the stack head.

A pick-off member 22 is mounted adjacent the leading wall 32 of the card holding station 10. This pick-off member also has a pair of fingers which extend into the peripheral channels or grooves which are formed about the drum 16. The fingers of the pick-off member 22 are arcuate in shape and have intermediate portions which are displaced radially outwardly from the periphery of the drum 16. This configuration of the fingers of the pick-off causes the cards transported by the drum to ride up over its fingers and be lifted outwardly from the periphery of the drum. Then, as each card is arrested by the stack head 20, its trailing edge projects tangentially to the periphery of the drum and over the fingers of the pick-off 22. The next succeeding card transported by the drum will then ride over the fingers of the pick-off 22 and under the preceding card, in a manner to pry the preceding card from the periphery of the drum. The succeeding card is then arrested by the stack head and the preceding card is deposited in the card holding station 10. In this manner, the card holding station is conditioned to its stacking mode in which cards transported by the drum 16 to the stack head are deposited in the station.

Figures 3, 4:
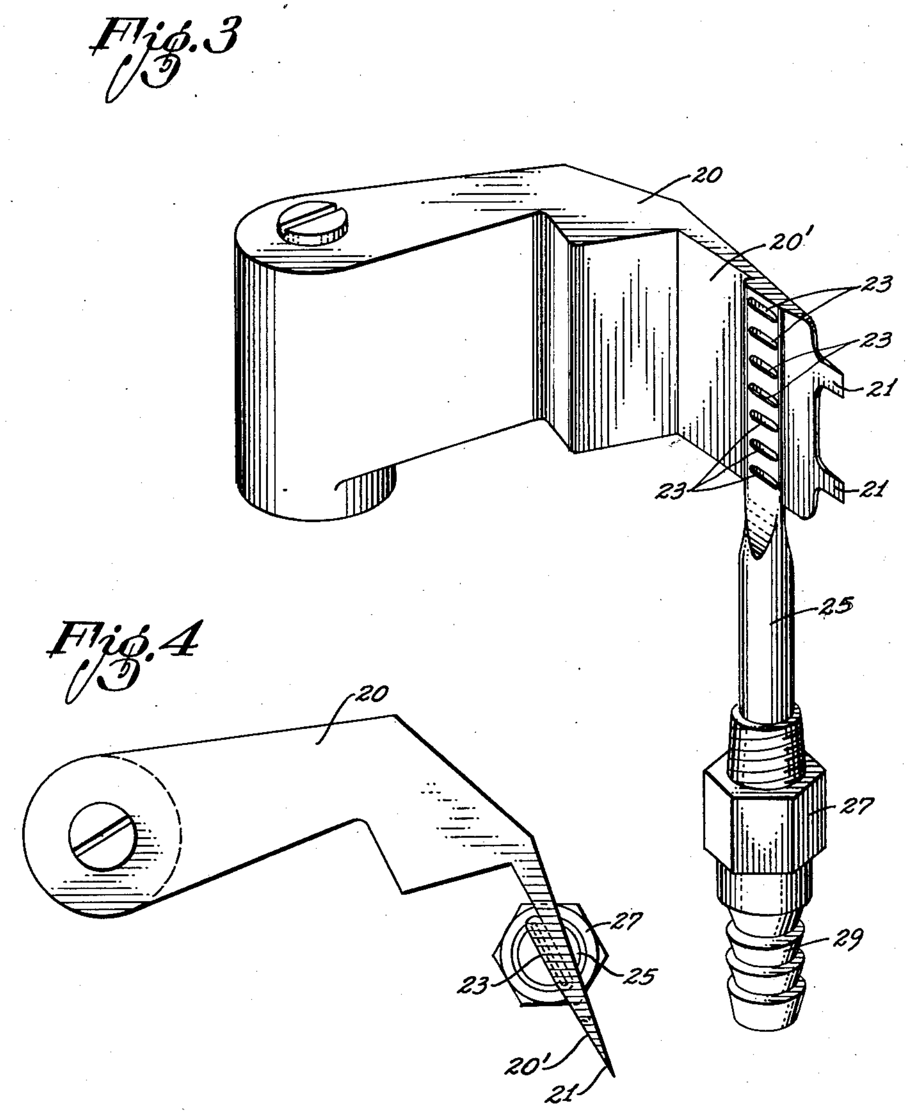
Figure 3 is an enlarged perspective view of a stack head which constitutes a component of one embodiment of the improved card holding station of the invention, this view illustrating the manner in which a plurality of orifices are formed on one surface of the stack head to permit a vacuum pressure to be established at that surface and thereby reduce the impact of the cards against the stack head.
Figure 4 is a top plan view of the stack head of Figure 3, this latter view illustrating more particularly the shape of the surface of the stack head at which the vacuum pressure is established, which surface is adapted to extend into substantial tangential relation with the transport drum when the stack head is in its operative position.

As noted above, prior art apparatus including reversible stations of the type just described have been operated satisfactorily. However, as mentioned above, the impact of the leading edges of the cards in such prior art arrangements as the cards were arrested by the stack head 20 created excessive wear to the cards and tended to damage these leading edges. In accordance with one embodiment of the present invention, and as shown more clearly in Figures 3 and 4, the stack head 20 includes a surface 20' which extends in essentially tangential relationship to the periphery of the drum 16 when the stack head is moved to its operative position. The stack head also includes the fingers 21 referred to above which move into the peripheral grooves of the transport drum in the described manner when the stack head is in its operative position. Then, when a card is transported by the drum 16 across the mouth of the station 10, and when the stack head 20 is in its operative position, such card rides up over the fingers 21 so that its leading edge is stripped from the periphery of the drum 16, and the leading edge of the card then rides over the surface 20' of the stack head to be arrested normally by the body portion of the stack head.

In accordance with the present invention, a plurality of orifices 23 are provided in the surface 20' of the stack head. The pipe line 25 communicates with an internal passageway of the stack head, and the internal passageway extends to the orifices. A suitable fitting 27 is provided at the lower end of the line 25 to which a nipple 29 is attached. The nipple 29 serves to receive a suitable tube, not shown, which extends to a vacuum pressure source.

By means of the above arrangement, a vacuum pressure may be established at the orifices 23. This vacuum pressure is made sufficient so that when a card is to be arrested by the stack head 20, such card as it rides over the surface 20' is braked by the vacuum pressure of the orifices 23 and brought to a stop either before it reaches the body portion of the stack head so as to reduce the impact of its leading edge against the stack head to zero; or the cards are allowed to be brought almost to a stop by the vacuum force so that each one is finally arrested in a gentle manner by the body portion of the stack head. In this manner, the cards are brought to a stop and arrested at the mouth of the station 10 so that such cards may be deposited in this station, and this is achieved without violent impacting of the cards against the stack head. It has been found that the life of the information storage cards is increased to a large extent when the modified card holding stations of the present invention are used.

It should again be pointed out that although the described embodiments of the invention show movable stack heads in corresponding reversible card holding stations, the invention finds utility in conjunction with any type of stacking station, whether the stack head is movable or not.

The card holding station 12 may be constructed in a manner similar to the construction of the card holding station 10, and for that reason, its components are not numbered in Figure 1 and will not be individually described. As mentioned previously, the card holding station 10 is illustrated in Figure 1 in its feeding mode in which the feed head 18 is moved forward to an operational position and the stack head 20 is withdrawn to a standby position. The card holding station 12, on the other hand, is illustrated as being in a stacking mode in which its stack head is moved forward to an operative position and its feed head is withdrawn to a standby position.

The feed head and stack head of the card holding stations 10 and 12 may, as mentioned above, be operated by an appropriate system of cams and levers. The actual operation of these heads is fully described in the copending application Serial No. 645,639 referred to above. Since the actual mechanical control of the movements of the stack head and the feed head for each station does not form a part of the present invention, such a control will not be described in detail here. It is also evident that any suitable control can be used to control the feed heads and stack heads between their operative positions and their standby positions at the proper times.

The card holding station 10 in its feeding mode of operation may contain a group of information storage cards supported in the station in an upright stacked manner. In the feeding mode, the station 10 is conditioned to controllably feed the cards in a one-by-one sequence to the periphery of the transport drum 16. The card holding station 12 at this time is in its stacking mode so that cards transported to its stack head are deposited in that station. The cards from the card holding station 10 may now be controllably fed to the periphery of the transport drum 16 and transported by that drum past the transducer 13 for processing. Such processing, for example, may constitute either reading information already recorded on the various cards, or recording new information on selected ones of the cards. After processing of the cards by the transducer 13, they may be deposited in the card holding station 12. Of course, many other operations may be made in the handling of the cards in different types of processing systems and apparatus.

At the completion of the operations described in the preceding paragraph, and when the card holding station 10 is empty and all cards have been transferred to the card holding station 12, the operational modes of the stations are reversed so that the cards are returned in their original order to the card holding station 10. The cards may be further processed by the transducer 14 as they are so returned to the card holding station 10.

A pusher member 30 is included in the card holding station 10, and a similar pusher member is included in the card holding station 12. The pusher member 30 is adapted to move along the floor of the card holding station 10 between the spaced parallel walls 32 and 34 which, as noted, constitute the leading and trailing side walls of the station. These walls are spaced apart a distance corresponding essentially to the length of each card supported in the station 10.

The purpose of the pusher member 30 is to maintain the cards in stacked relation in the card holding station. To accomplish this purpose, the pusher member is biased in the direction of the mouth of the station to resiliently urge the cards forward in the station. This is so that the leading card may rest against the surface 18' of the feed head 18 and against the peripheral surface of the drum 16 when the station is in its feeding mode, and so that the leading card will rest against the stack head 20 and against the pick-off 22 and the peripheral surface of the drum 16 when the station is in its stacking mode. The pusher member 30 maintains the cards in a firm, stacked condition, as noted above, and as the cards are fed out of the card holding station the pusher moves forwardly to exert a continuous pressure on the remaining cards and to hold these cards in a stacked relationship in the station. Alternately, when cards are fed into the card holding station 10, the pusher 30 is moved backwardly against its spring pressure so that it still exerts a force on the cards in the station to maintain them in a stacked relationship.

The pusher member 30 may be constructed in a manner described in detail in copending application of Alfred E. Gray et al., Serial No. 641,752, filed February 21, 1957. As fully described in that application, the pusher includes a bracket 39 which is secured to a base plate 36, the base plate being adapted to slide back and forth along the floor of the card holding station. A suitable resilient pad 40 is mounted on the front of the bracket 39, and this pad engages the cards in the station. The bracket 39 carries a switch armature 46 which engages a pair of switching contacts 44 on the feed head 18 when the last card is fed from the station to the periphery of the drum 16. This engagement of the switch armature with its switching contacts facilitates the electrical control of the movements of the feed heads and stack heads of the stations, described more fully in copending application Serial No. 645,639, referred to earlier in the present specification.

The bracket 39 of the pusher 30 supports also a rotatable member 50 which extends into a slot in the base plate 36. A resilient spring strip 52 extends upwardly through a slot 56 in the floor of the card holding station and around the rotatable member 50. This resilient strip has a tendency to coil itself into a coiled configuration, and in so doing causes the rotatable member 50 to rotate and resiliently biases the pusher 30 toward the mouth of the station. In this manner, the cards in the station are continually biased toward the mouth of the station and are held in a stacked condition.

Details of the vacuum transporting drum 16 are shown in the view of Figure 2. The illustrated drum is similar in its construction to the rotatable transporting drum disclosed and claimed in copending application Serial No. 600,975, filed July 30, 1956, in the name of Loren R. Wilson.

As shown in Figure 2, the vacuum transport drum 16 is made up of a lower section and an upper section. The lower section includes a disk-like bottom portion 118 and an annular side portion 120. The disk-like bottom portion and the annular side portion, which make up the lower section of the drum, are integral with one another.

A pair of axially spaced peripheral orifices 122 and 124 extend through the side portion 120. Each of these orifices is discontinuous in that it is interrupted at selected intervals about its angular length by ribs 126. The ribs are integral with the side portion 120. The orifices 122 and 124 each has an external peripheral annular channel for receiving the fingers 21 of the stack head 20 and the fingers of the pick-off 22 as described above. As noted, this engagement of the fingers of the stack head and of the pick-off with the annular channels in the drum permits the cards to be removed from the periphery of the drum and deposited in the station 10 or in the station 12 in the described manner and depending upon which of these stations is in a stacking mode.

The disk-like bottom portion 118 of the lower section of the drum is undercut as shown at 128. This enables the edge of the table top 11 to extend beyond the outer limits of the side portion 120. Therefore, even without excessively close tolerances between the edge of the table top 11 and the rotating surface of the drum 16, the cards supported endwise on the table top in the card holding stations 10 and 12 have no tendency to slip down between the table and the drum as these cards are transferred to and from the periphery of the drum. There is, therefore, no tendency for the cards to become misplaced or damaged.

The upper section of the drum 16 is in the form of a disk-like member 130 which engages the annular side portion 120 of the lower section. The member 130 forms an enclosure with the lower section of the drum, with the member 130 being positioned parallel to the disk-shaped bottom portion 118 of the lower section. The member 130 is held in place on the annular side portion 120 by a plurality of screws 132.

A deflector ring 140 is supported within the interior of the drum 16 in press-fit with the inner surface of the annular side portion 120. This deflector ring is tapered toward the center of the drum to prevent turbulence and to provide a streamlined path for air that is drawn in through the orifices 122 and 124.

The bottom portion 118 of the lower section of the drum 16 contains a central opening which is surrounded by an annular collar 141. The collar 141 surrounds a shoulder 142 which is provided at one end of a hollow shaft 144. The drum 16 is supported on the shoulder 142, and the end of the shaft 144 extends into the opening in the bottom portion 118 in friction-fit with that portion. Therefore, rotation of the hollow shaft 144 causes the drum 16 to rotate. Also, the interior of the hollow shaft 144 communicates with the interior of the drum.

A pair of bearings 146 are provided at opposite ends of the shaft 144. The inner races of these bearings are mounted on the shaft, and their outer races are held by bushings 148. These bushings are secured to a housing 150 by means of a plurality of screws 152. An arcuate opening 156 is provided in the housing 150 between the bearings 146. This opening enables a drive belt 158 to extend into the housing and around a pulley 160. The pulley 160 is keyed to the shaft 144 between the bearings 146, and it is held against axial movement by a pair of sleeves 162 which are supported on the shaft between the bearings 146. In this way, the shaft 144 and the drum 16 can be rotated by a suitable motor (not shown), the motor being mechanically coupled to the pulley 160 by the drive belt 158.

The bearings 146 and the sleeves 162 are held on the shaft 144 by a nut 166. This nut is screwed on a threaded portion at the lower end of the shaft, and a lock washer 164 is interposed between it and the lower bearing 146. A sealing disk 168 is also screwed on the threaded portion at the lower end of the shaft 144. The sealing disk 168 operates in conjunction with a bottom plate 170 to tend to prevent the movement of air between the interior of the housing 150 and the interior of the hollow shaft 144 when a pressure differential exists between the housing and the shaft.

The bottom plate 170 is mounted to the housing 150 by a plurality of screws 172, and this plate serves to close the lower end of the housing. A circular central opening is provided in the bottom plate 170, and a hollow conduit 174 extends into the opening in friction-fit with the plate 170. The conduit 174 is axially aligned with the hollow shaft 144 so that air may be exhausted by a vacuum pump 176 from the hollow interiors of the shaft and the conduit. The vacuum pump 176 may be of any suitable known construction and, for that reason, is shown merely in block form.

The vacuum pump 176 draws air in through the orifices 122 and 124, through the interior of the drum 16, down the shaft 144 and through the conduit 174. This creates a vacuum pressure at the outer peripheral surface of the annular portion 120 of the lower section of the drum. This vacuum pressure serves to firmly retain the cards received from the card holding stations 10 and 12 on the peripheral surface of the drum as such cards are transported by the drum between these two stations.

When the station 10, or the station 12, is constructed in accordance with a second embodiment of the invention, as illustrated in Figures 5, 6 and 7 a tongue 200 is provided to define the feed throat. The tongue 200 is mounted on the leading edge of the trailing guide rail or wall 34 of the station, and it extends from that leading edge to a position closely adjacent the periphery of the surface of the drum 16. The tongue 200 may be positioned intermediate the top and bottom of the guide rail 34. The outer end of the tongue 200 is spaced from the periphery of the drum 16 within precisely controlled tolerances by a distance corresponding to slightly more than the width of one information storage card but less than the width of two cards. Then, cards may be fed from the card holding station, or from the card holding station 12, by intermittently interrupting the vacuum pressure at the feed head 18 for a time sufficient to release one card only, or the vacuum pressure may be turned off at the feed head for a longer interval at which time the cards will be fed in sequence past the tongue 200 and through the throat formed by that tongue and the periphery of the drum 16.

As clearly shown in Figures 5, 6 and 7, the modified stack head of the second embodiment of the invention is designated as 20*a* and with a groove 202. This groove receives the tongue 200 as the stack head 20*a* is moved forward to its operative position. This, as described in the copending case, permits the stack head to close the throat and properly perform its arresting function when the station is conditioned to a stacking mode. The stack head 20*a* has a width corresponding to the width of each card so that when it is moved to its operative position it arrests each card by exerting a force along the entire leading edge of such card. This, in conjunction with the vacuum braking action to be described, reduces to practically zero any wear that may otherwise be created at the leading edge of the arrested cards.

In many respects, a modified stack head 20*a* of Figures 5, 6 and 7 may be similar to the stack head 20 described above. The stack head 20*a* has a surface 20'*a* and 20''*a* on either side of the central groove 202, and a plurality of orifices 23*a* are formed in these surfaces. The orifices 23*a* communicate by means of respective passageways in the stack head 20*a* with a tube 25*a*. The tube 25*a* may extend to similar fittings as the assembly of Figures 3 and 4, and it may be fitted with an appropriate means for coupling it to a suitable vacuum pressure force. As before, the vacuum pressure source causes a vacuum force to be produced at the orifices 23*a* so that a braking action for the cards on the surfaces 20'*a* and 20''*a* may be provided.

As shown more clearly in Figure 7, the tube 25*a* moves in a slot 204 in the table top 11 as the stack head 20*a* is moved between its operative and its standby positions. At the same time, the supporting post for the stack head moves in a similar arcuate slot 206 in the table top 11.

In the described manner, therefore, the improved card holding station of the present invention permits cards to be deposited from the transport medium into the card holder portion of the station without producing excessive wear or damage to the cards. A vacuum force is provided at the stack head which serves to brake the cards arrested by the stack head without excessive impact, so that such cards may be deposited in the card holding station. The action of the improved station of the invention achieves the desired results of minimizing wear, and yet it in no way slows up the speed with which cards may be transferred from the transport medium to the card holding station.

We claim:

1. In apparatus for processing data on a plurality of information storage cards, the combination of: transport means for the cards, card holding means having a mouth disposed adjacent the transport means, a stack head positioned adjacent the mouth of the card holding means at a position near the leading ends of the cards in the card holding means for arresting the transported cards to obtain a transfer of the cards into the card holding means, the stack head being disposed in contiguous relationship to the transport means and being provided with a surface to engage the transported cards for a movement of the cards along this surface and into the stack head, and means coupled to the stacking means for establishing a vacuum pressure at said surface of the stack head to reduce the impact of the cards arrested thereby.

2. In apparatus for processing data on a plurality of information storage cards, the combination of: transport means movable to provide a movement of the cards with the transport means, card holding means having a mouth disposed adjacent the transport means, a stack head positioned adjacent the mouth of the card holding means at the end of the card holding means holding the leading ends of the cards for arresting cards transported by the transport means to obtain a movement of such cards into the card holding means, the stack head being disposed in coupled relationship to the transport means and being provided with a surface to obtain a sliding movement along such surface of each card to be arrested by the stack head, and means coupled to said stack head for establishing a vacuum braking pressure at said surface of the stack head.

3. In apparatus for processing data on a plurality of information storage cards, the combination of: means including a movable transport drum constructed to hold the cards in fixed position on the peripheral surface of the drum for transporting the cards on the peripheral surface of the drum in accordance with the movement of the drum, card holding means having a mouth disposed adjacent the peripheral surface of the transport drum, a stack head positioned adjacent the mouth of the card holding means at the end of the card holding means adjacent to the leading ends of the cards in the card holding means for arresting the cards transported by the transport drum to obtain a transfer of such cards into the card holding means, said stack head being disposed in coupled relationship to the cards on the transport means and having a surface disposed relative to the peripheral surface of the transport drum to obtain a sliding movement along such surface of each card to be arrested by the stack head, and means coupled to the stack head for establishing a vacuum pressure at said surface of the stack head to reduce the impact of the arrested cards against the stack head.

4. In apparatus for processing data on a plurality of information storage cards, the combination of: a rotatable vacuum pressure transport drum constructed to transport the cards on its peripheral surface, a card holding station having a leading wall and a trailing wall with respect to the rotation of the drum and having a mouth disposed adjacent the peripheral surface of the drum, a stack head positioned adjacent the trailing wall of the card holding station at the mouth thereof and having an operative position relative to the cards on the drum for arresting the cards transported by the drum to obtain a transfer of the transported cards into the card holding station, said stack head having a particular surface extending in a direction having a major component tangential to the peripheral surface of the transport drum in the operative position of the stack head to obtain a movement of the cards along the surface, there being at least one orifice in the particular surface in the stack head, and means coupled to the stack head for establishing a vacuum pressure at the orifice in said particular surface of the stack head to reduce the impact of the arrested cards against the stack head.

5. In apparatus for processing data on a plurality of information storage cards, the combination of: a transport medium for the cards, a card holding station having a leading wall and a trailing wall with respect to the motion of cards on the transport medium and having a mouth disposed adjacent the transport medium, a feed head positioned adjacent the leading wall of the card holding station at the mouth thereof and movable between an operative position and a standby position, the feed head serving to control the transfer of cards to the transport medium from the card holding station when in its operative position, a stack head positioned adjacent the trailing wall of the card holding station at the mouth thereof and movable between a standby position and an operative position, the stack head being disposed to arrest the cards carried by the transport medium when in its operative position to obtain a transfer of the transported cards into the card holding station, said stack head having a particular surface extending essentially tangentially to the transport medium in the operative position of the stack head, there being at least one orifice in the particular surface of the stack head, and means coupled to the stack head and communicating with the orifice in the particular surface of the stack head for establishing a vacuum pressure at the orifice in said surface of the stack head to reduce the impact of the arrested cards against the stack head.

6. In apparatus for processing data on a plurality of information storage cards, the combination of: a rotatable vacuum pressure drum for transporting cards on its peripheral surface, a card holding station having a leading wall and a trailing wall with respect to the rotation of the drum and having a mouth disposed adjacent the peripheral surface of the drum, a feed head positioned adjacent the leading wall of the card holding station at the mouth thereof and movable between an operative position and a standby position, the feed head serving to control the transfer of cards from the card holding station to the drum when in its operative position, a stack head positioned adjacent the trailing wall of the card holding station at the mouth thereof and movable between a standby position and an operative position, the stack head when in its operative position being disposed to arrest the cards transported by the drum to obtain a transfer of such cards into the card holding station, the stack head having a particular surface extending essentially tangentially to the peripheral surface of the transport drum when the stack head is in its operative position, there being a plurality of orifices in the particular surface, and means coupled to the stack head and communicating with the orifices in the particular surface of the stack head for establishing a vacuum pressure at the orifices in said surface of the stack head to reduce the impact of the arrested cards against the stack head.

7. In apparatus for processing data on a plurality of information storage cards, the combination of: transport means for the cards and constructed to obtain a movement of the cards in a curved path, card holding means disposed relative to the transport means to receive cards from the transport means and constructed to hold the cards in stacked relationship, stacking means provided with at least one finger, the finger in the stacking means being disposed at a position contiguous to the card holding means and in coupled relationship to the transport means in a direction tangential to the movement of the cards to obtain a movement of the cards along the finger for the transfer of the cards into the card holding means, there being in the finger at least one orifice at an intermediate position in the path of movement of the cards along the finger, and means coupled to the orifice for directing a fluid through the orifice to produce a force for reducing the speed of the cards during the movement of the cards along the finger.

8. The apparatus set forth in claim 7 in which the transport means is movable in a closed loop and is constructed to retain the cards on the transport means for movement with the transport means and in which the fluid means produces a vacuum at the orifice in the finger to reduce the speed of the cards during the movement of the cards along the finger.

9. In apparatus for processing data on a plurality of information storage cards, the combination of: transport means for the cards, card holding means disposed relative to the transport means to receive cards from the transport means and constructed to hold the cards in stacked relationship, stacking means operative upon the cards on the transport means for obtaining a controlled movement of cards along the stacking means to a position against the transport means and for obtaining a controlled transfer of cards from the transport means to the card holding means after such movement, and stationary means included in the stacking means for establishing a fluid pressure at the stacking means during the movement of the cards along the stacking means to reduce the impact of the transported cards against the stacking means.

10. In apparatus for processing data on a plurality of information storage cards, the combination of: transport means for the cards, card holding means disposed relative to the transport means to receive cards from the transport means and constructed to hold the cards in stacked relationship, stacking means disposed near the leading ends of the cards in the card holding means and operative upon the transported cards for obtaining a controlled movement of the cards along the stacking means to a position abutting the stacking means and for obtaining a controlled transfer of such cards by the stacking means from the transport means to the card holding means after such movement of the cards along the stacking means, and means included in the stacking means for establishing a vacuum pressure at the stacking means to reduce the impact of the transported cards against the stacking means during the movement of the cards along the stacking means.

11. In apparatus for processing data on a plurality of information storage cards, the combination of: transport means for the cards, card holding means having a mouth disposed relative to the transport means to receive cards from the transport means and constructed to hold the cards in stacked relationship, a stack head positioned adjacent the mouth of the card holding means at a position near the leading ends of the cards in the card holding means for obtaining a movement of the cards along the stack head and for arresting the cards after such movement to obtain a transfer of such cards into the card holding means, and means coupled to the stack head for establishing a vacuum pressure at the stack head to reduce the speed of the cards during the movement of the cards along the stack head.

References Cited in the file of this patent

UNITED STATES PATENTS

| | | |
|---|---|---|
| 2,381,719 | Brintnall | Aug. 7, 1945 |
| 2,805,858 | Hayes | Sept. 10, 1957 |